(12) United States Patent
Wu et al.

(10) Patent No.: US 12,099,479 B1
(45) Date of Patent: Sep. 24, 2024

(54) METHOD FOR GENERATING SCIENTIFIC DATA MANAGEMENT IN FIELD OF POPULATION HEALTH BASED ON MIND MAP

(71) Applicant: Institute of Medical Information, Chinese Academy of Medical Sciences, Beijing (CN)

(72) Inventors: Sizhu Wu, Beijing (CN); Xiaolei Xiu, Beijing (CN); Zhengyong Hu, Beijing (CN)

(73) Assignee: Institute of Medical Information, Chinese Academy of Medical Sciences, Beijing (CN)

( * ) Notice: Subject to any disclaimer, the term of this patent is extended or adjusted under 35 U.S.C. 154(b) by 0 days.

(21) Appl. No.: 18/645,421

(22) Filed: Apr. 25, 2024

(30) Foreign Application Priority Data

Oct. 31, 2023 (CN) .......................... 202311425816.4

(51) Int. Cl.
*G06F 16/21* (2019.01)
(52) U.S. Cl.
CPC ................................... *G06F 16/21* (2019.01)
(58) Field of Classification Search
CPC ...................................................... G06F 16/21
USPC ........................................................ 707/609
See application file for complete search history.

(56) References Cited

U.S. PATENT DOCUMENTS

| | | | |
|---|---|---|---|
| 5,711,297 A * | 1/1998 | Iliff ........................ | G16H 10/60 600/300 |
| 8,364,623 B1 * | 1/2013 | Bunker .................... | G06F 16/26 707/794 |
| 9,626,385 B2 * | 4/2017 | Runchey ................. | G06F 16/20 |
| 11,080,336 B2 * | 8/2021 | Van Dusen ............. | G06Q 10/10 |
| 2011/0208822 A1 * | 8/2011 | Rathod ................... | G06Q 30/02 709/206 |

(Continued)

FOREIGN PATENT DOCUMENTS

| CN | 113488180 A | 10/2021 |
|---|---|---|
| CN | 115115740 A | 9/2022 |

OTHER PUBLICATIONS

Ivanova, Tatyana, "Collaborative methodology for semantic modelling of learning domain knowledge", CompSys Tech '23, Ruse, Bulgaria, Jun. 16-17, 2023, pp. 174-179.*

(Continued)

*Primary Examiner* — Robert Stevens
(74) *Attorney, Agent, or Firm* — Bayramoglu Law Offices LLC

(57) ABSTRACT

A method for generating a scientific data management in the field of population health based on a mind map includes the steps of: obtaining semantic knowledge of a data management plan, and an original data management plan based on requirements of a project; building a semantic knowledge model and mind map mapping specifications of the data management plan based on the semantic knowledge of the data management plan; mapping information about each part of the original data management plan into node information, additional information and information about tree structure relationships among nodes of the mind map based on the mind map mapping specifications to form a mapping relationship; and generating and exporting a scientific data management plan based on the mind map.

4 Claims, 7 Drawing Sheets

(56) References Cited

U.S. PATENT DOCUMENTS

| | | | |
|---|---|---|---|
| 2014/0075004 A1* | 3/2014 | Van Dusen | G07C 13/00 |
| | | | 709/223 |
| 2015/0134573 A1 | 5/2015 | Donatelli et al. | |
| 2018/0089383 A1* | 3/2018 | Allen | G16H 15/00 |
| 2018/0150488 A1* | 5/2018 | Runchey | G06F 8/31 |

OTHER PUBLICATIONS

Bense, Hermann, et al., "A Richer Notation for the Representation of Ontological Knowledge", ICCESSE 2013, London, UK, © 2013, 10 pages.*

Ayed, Rihab, et al., "A Mind Map Query in Information Retrieval: The 'User Query Idea' Concept and Preliminary Results", Comput. Sci. Inf. Technol., vol. 12, Jul. 2014, pp. 197-214.*

Wei, Yang, et al., "Revealing Semantic Structures of Texts: Multi-grained Framework for Automatic Mind-map Generation", IJCAI '19, Aug. 2019, pp. 5247-5254.*

* cited by examiner

```
<?xml version="1.0"?>
<rdf:RDF xmlns="http://www.semanticweb.org/xiuxi/ontologies/2023/2/untitled-ontology-20/"
    xml:base="http://www.semanticweb.org/xiuxi/ontologies/2023/2/untitled-ontology-20/"
    xmlns:owl="http://www.w3.org/2002/07/owl#"
    xmlns:rdf="http://www.w3.org/1999/02/22-rdf-syntax-ns#"
    xmlns:xml="http://www.w3.org/XML/1998/namespace"
    xmlns:xsd="http://www.w3.org/2001/XMLSchema#"
    xmlns:rdfs="http://www.w3.org/2000/01/rdf-schema#"
    xmlns:untitled-ontology-20="http://www.semanticweb.org/xiuxi/ontologies/2023/2/untitled-ontology-20#">
    <owl:Ontology rdf:about="http://www.semanticweb.org/xiuxi/ontologies/2023/2/untitled-ontology-20"/>
    <owl:ObjectProperty rdf:about="http://www.semanticweb.org/xiuxi/ontologies/2023/2/untitled-ontology-20#has_answer">
        <rdfs:subPropertyOf rdf:resource="http://www.w3.org/2002/07/owl#topObjectProperty"/>
        <rdfs:domain rdf:resource="http://www.semanticweb.org/xiuxi/ontologies/2023/2/untitled-ontology-20#Questions related to data acquisition"/>
        <rdfs:range rdf:resource="http://www.semanticweb.org/xiuxi/ontologies/2023/2/untitled-ontology-20#Answers related to data acquisition"/>
    </owl:ObjectProperty>
    <owl:Class rdf:about="http://www.semanticweb.org/xiuxi/ontologies/2023/2/untitled-ontology-20#DMP name"/>
    <owl:Class rdf:about="http://www.semanticweb.org/xiuxi/ontologies/2023/2/untitled-ontology-20#Data acquisition"/>
        <rdfs:subClassOf rdf:resource="http://www.semanticweb.org/xiuxi/ontologies/2023/2/untitled-ontology-20#Plan details"/>
        <rdfs:comment>This section will describe the data you plan to collect or develop</rdfs:comment>
    </owl:Class>
    <owl:Class rdf:about="http://www.semanticweb.org/xiuxi/ontologies/2023/2/untitled-ontology-20#Answers related to data acquisition"/>
        <rdfs:subClassOf rdf:resource="http://www.semanticweb.org/xiuxi/ontologies/2023/2/untitled-ontology-20#Data acquisition"/>
    </owl:Class>
    <owl:Class rdf:about="http://www.semanticweb.org/xiuxi/ontologies/2023/2/untitled-ontology-20#Questions related to data acquisition"/>
        <rdfs:subClassOf rdf:resource="http://www.semanticweb.org/xiuxi/ontologies/2023/2/untitled-ontology-20#Data acquisition"/>
    </owl:Class>
    <owl:Class rdf:about="http://www.semanticweb.org/xiuxi/ontologies/2023/2/untitled-ontology-20#Plan details"/>
        <rdfs:subClassOf rdf:resource="http://www.semanticweb.org/xiuxi/ontologies/2023/2/untitled-ontology-20#DMP name"/>
    </owl:Class>
</rdf:RDF>
```

FIG. 8

```xml
<?xml version="1.0"?>
<rdf:RDF xmlns="http://www.semanticweb.org/xiuxi/ontologies/2023/2/untitled-ontology-20/"
    xml:base="http://www.semanticweb.org/xiuxi/ontologies/2023/2/untitled-ontology-20/"
    xmlns:owl="http://www.w3.org/2002/07/owl#"
    xmlns:rdf="http://www.w3.org/1999/02/22-rdf-syntax-ns#"
    xmlns:xml="http://www.w3.org/XML/1998/namespace"
    xmlns:xsd="http://www.w3.org/2001/XMLSchema#"
    xmlns:rdfs="http://www.w3.org/2000/01/rdf-schema#"
    xmlns:untitled-ontology-20="http://www.semanticweb.org/xiuxi/ontologies/2023/2/untitled-ontology-20#">
    <owl:Ontology rdf:about="http://www.semanticweb.org/xiuxi/ontologies/2023/2/untitled-ontology-20"/>
    <owl:ObjectProperty rdf:about="http://www.semanticweb.org/xiuxi/ontologies/2023/2/untitled-ontology-20#has_answer">
        <rdfs:subPropertyOf rdf:resource="http://www.w3.org/2002/07/owl#topObjectProperty"/>
        <rdfs:domain rdf:resource="http://www.semanticweb.org/xiuxi/ontologies/2023/2/untitled-ontology-20#Questions related to data acquisition"/>
        <rdfs:domain rdf:resource="http://www.semanticweb.org/xiuxi/ontologies/2023/2/untitled-ontology-20#Answers related to data acquisition"/>
    </owl:ObjectProperty>
    <owl:DatatypeProperty rdf:about="http://www.semanticweb.org/xiuxi/ontologies/2023/2/untitled-ontology-20#Comment"/>
        <rdfs:range rdf:resource="http://www.w3.org/2001/XMLSchema#string"/>
    </owl:DatatypeProperty>
    <owl:Class rdf:about="http://www.semanticweb.org/xiuxi/ontologies/2023/2/untitled-ontology-20#DMP name"/>
    <owl:Class rdf:about="http://www.semanticweb.org/xiuxi/ontologies/2023/2/untitled-ontology-20#Data acquisition"/>
        <rdfs:subClassOf rdf:resource="http://www.semanticweb.org/xiuxi/ontologies/2023/2/untitled-ontology-20#Plan details"/>
        <rdfs:comment>This section will describe the data you plan to collect or develop</rdfs:comment>
    </owl:Class>
    <owl:Class rdf:about="http://www.semanticweb.org/xiuxi/ontologies/2023/2/untitled-ontology-20#Answers related to data acquisition"/>
        <rdfs:subClassOf rdf:resource="http://www.semanticweb.org/xiuxi/ontologies/2023/2/untitled-ontology-20#Data acquisition"/>
    </owl:Class>
    <owl:Class rdf:about="http://www.semanticweb.org/xiuxi/ontologies/2023/2/untitled-ontology-20#Questions related to data acquisition"/>
        <rdfs:subClassOf rdf:resource="http://www.semanticweb.org/xiuxi/ontologies/2023/2/untitled-ontology-20#Data acquisition"/>
    </owl:Class>
    <owl:Class rdf:about="http://www.semanticweb.org/xiuxi/ontologies/2023/2/untitled-ontology-20#Plan details"/>
        <rdfs:subClassOf rdf:resource="http://www.semanticweb.org/xiuxi/ontologies/2023/2/untitled-ontology-20#DMP name"/>
    </owl:Class>
    <owl:NamedIndividual rdf:about="http://www.semanticweb.org/xiuxi/ontologies/2023/2/untitled-ontology-20#R and spss"/>
        <rdf:type rdf:resource="http://www.semanticweb.org/xiuxi/ontologies/2023/2/untitled-ontology-20#Answers related to data acquisition"/>
    </owl:NamedIndividual>
    <owl:NamedIndividual rdf:about="http://www.semanticweb.org/xiuxi/ontologies/2023/2/untitled-ontology-20#txt and csv"/>
        <rdf:type rdf:resource="http://www.semanticweb.org/xiuxi/ontologies/2023/2/untitled-ontology-20#Answers related to data acquisition"/>
    </owl:NamedIndividual>
    <owl:NamedIndividual rdf:about="http://www.semanticweb.org/xiuxi/ontologies/2023/2/untitled-ontology-20#What file format will be used?"/>
        <rdf:type rdf:resource="http://www.semanticweb.org/xiuxi/ontologies/2023/2/untitled-ontology-20#Questions related to data acquisition"/>
        <untitled-ontology-20:has_answer rdf:resource="http://www.semanticweb.org/xiuxi/ontologies/2023/2/untitled-ontology-20#txt and csv"/>
        <untitled-ontology-20:Comment>for all collected or generated data, please specify the file format to be used for storage, for example, plain text (.txt), comma separated value (.csv), geo-reference TIFF (.tif, .tfw)"</untitled-ontology-20:Comment>
    </owl:NamedIndividual>
    <owl:NamedIndividual rdf:about="http://www.semanticweb.org/xiuxi/ontologies/2023/2/untitled-ontology-20#Will you create any software or write any code to process or analyze the data?"/>
        <rdf:type rdf:resource="http://www.semanticweb.org/xiuxi/ontologies/2023/2/untitled-ontology-20#Questions related to data acquisition"/>
        <untitled-ontology-20:has_answer rdf:resource="http://www.semanticweb.org/xiuxi/ontologies/2023/2/untitled-ontology-20#R and spss"/>
        <untitled-ontology-20:Comment>If yes, please specify in details</untitled-ontology-20:Comment>
    </owl:NamedIndividual>
    <owl:NamedIndividual rdf:about="http://www.semanticweb.org/xiuxi/ontologies/2023/2/untitled-ontology-20#Hypertension data management plan"/>
        <rdf:type rdf:resource="http://www.semanticweb.org/xiuxi/ontologies/2023/2/untitled-ontology-20#DMP name"/>
    </owl:NamedIndividual>
</rdf:RDF>
```

FIG. 9

METHOD FOR GENERATING SCIENTIFIC DATA MANAGEMENT IN FIELD OF POPULATION HEALTH BASED ON MIND MAP

CROSS REFERENCE TO THE RELATED APPLICATIONS

This application is based upon and claims priority to Chinese Patent Application No. 202311425816.4, filed on Oct. 31, 2023, the entire contents of which are incorporated herein by reference.

TECHNICAL FIELD

The present disclosure relates to the technical field of data management, and particularly relates to a method for generating a scientific data management in the field of population health based on a mind map.

BACKGROUND

A Data Management Plan (DMP) is a written document that outlines the practices and management strategies for data acquisition, processing, sharing and preservation by researchers during the research of a project. The DMP is not a static document, instead it is a dynamic document that needs to be updated and modified as the project research progresses. The development of a DMP can assist all stakeholders in gaining a clear understanding of and tracking the entire process of data acquisition, processing, storage, sharing and preservation, thereby improving the efficiency of researchers in managing data, and contributing to guaranteeing data quality and reliability, and data security. However, developing a complete, clear, and feasible DMP is difficult, researchers are required to have abundant domain knowledge and data management experience.

The implementation of DMPs started late in China, and domestic scientific researchers have a weak awareness of developing DMPs. There are many problems, such as a shortage of data management personnel and insufficient professional knowledge and technical capabilities. Moreover, researchers still use the traditional text documents to write DMPs at present, which, although simple and easy to implement, has many drawbacks: (1) a lack of a structured expression method, making it difficult to clearly express the relationships and dependencies among various elements of the DMP; (2) a lack of flexibility, making it difficult to quickly adapt to dynamic changes in the DMP; and (3) difficulty in achieving team collaboration, with potential conflicts and duplications in the DMPs among team members.

There is an urgent need to develop a scientific data management plan generator that can intelligently recommend DMP templates based on the specific research content and data management requirements of researchers, and assist researchers in developing DMPs; that can facilitate dynamic interaction with researchers in the form of a visual knowledge graphs, and assist researchers in sorting out and organizing various elements of the DMPs, and that can dynamically develop and manage the DMPs with team members in a team collaboration manner, so as to save the time costs of researchers, ensure that the generated DMP templates have uniform standards and specifications, guarantee the quality of the DMPs and improve the accessibility and reproducibility of scientific data.

Therefore, those skilled in the prior art are in an urgent need to provide a method for generating a scientific data management in the field of population health based on a mind map, so as to solve the problems that the existing DMPs are scattered, lacking integrity and association, messy and redundant content.

SUMMARY

In view of the foregoing problems, the present disclosure provides a method for generating a scientific data management in the field of population health based on a mind map, which can achieve the effect of structured processing.

In order to achieve the above objective, the present disclosure adopts the following technical solution:
a method for generating a scientific data management in the field of population health based on a mind map, including the following steps:
S1. obtaining semantic knowledge of a data management plan, and an original data management plan based on requirements of a project;
S2. building a semantic knowledge model and mind map mapping specifications of the data management plan based on the semantic knowledge of the data management plan;
S3. mapping information about each part of the original data management plan into node information, additional information and information about tree structure relationships among nodes of a mind map based on the mind map mapping specifications to form a mapping relationship;
S4. establishing the mind map based on the mapping relationship; and
S5. generating and exporting a scientific data management plan based on the mind map.

For the above method, optionally, "a semantic knowledge model of the data management plan" in S2 is used to support a user in developing the data management plan by himself and collaborating with team members to develop the data management plan in a collaborative manner; and
the mind map mapping specifications are divided into mind map mapping specifications based on a list of questions and mind map mapping specifications based on the semantic knowledge model.

For the above method, optionally, the mind map mapping specifications based on the list of questions include mapping specifications of a title and mapping specifications of the list of questions, where the mapping specifications of the title includes a name and a module of the data management plan, the module includes a module name and additional information about the module, and additional information about the module includes description or explanatory information about module contents; and
the mind map mapping specifications based on the semantic knowledge model include mapping specifications of nodes and attributes, mapping specifications of relationships among the nodes, modification and improvement specifications of the mind map formed after mapping, and mapping specifications for team members to collaborate in developing the data management plan.

For the above method, optionally, in S3, the node information includes a node name, a plan name corresponding to the original data management plan, a module name, questions and answers, and concept names of classes and instances in the semantic knowledge model of the data management plan;

the additional information includes attributes of nodes, supplementary and explanatory information corresponding to the module name and problems of the original data management plan, and attribute information about classes and instances in the semantic knowledge model of the data management plan;

the tree structure relationships among the nodes include starting node information, ending node information and relationship attributes between two nodes; and information about a tree structure relationship between two nodes is determined according to the mapping relationship.

For the above method, optionally, "information about a tree structure relationship between two nodes is determined according to the mapping relationship" includes:

1) the mind map mapping specifications based on the list of questions is determined as the information about the tree structure relationship between two nodes, the plan name is determined as a central theme name of the mind map, and an N-level module name is mapped to an N-level node name of the mind map; when a question contains an answer, the answer is mapped to a leaf node; and when no answer is available to the question, the question is mapped to the leaf node; and 2) the mind map mapping specifications based on the semantic knowledge model is determined as the information about the tree structure relationship between two nodes, a superclass in the semantic knowledge model is determined as a starting node according to the mapping relationship, and a subclass or an instance corresponding to the superclass is determined as an ending node; or a node corresponding to a domain attribute of the semantic relationship is determined as a starting node, and a node corresponding to a range attribute of the semantic relationship is determined as an ending node; and relationship attributes between two nodes are determined according to a semantic relationship between a parent node and a child node or a parent node and an instance, as well as between two classes or two instances.

For the above method, optionally, in S4, "establishing the mind map" includes: comparing the nodes and the graph relationships among nodes of the mind map obtained by mapping with the tree structure relationship of the mind map, finding redundant nodes and graph relationships from the mind map obtained by mapping, and adding a list of nodes to be deleted and a list of graph relationships to be deleted; and finding missed graph relationships from the mind map obtained by mapping, and adding a list of graph relationships to be supplemented.

For the above method, optionally, in S5, "generating a data management plan" includes: steps of generating a human-readable data management plan presented in the form of a list of questions, or a data management plan presented in the form of a mind map, or steps of generating files of a machine-readable data management plan, where the redundant nodes and graph relationships in the mind map are subject to deletion constraints according to the mind map mapping specifications, the list of nodes to be deleted, the list of graph relationships to be deleted and the list of graph relationships to be supplemented, and missed relationships in the mind map are supplemented, such that a mind map that can clearly and accurately express the content of the data management plan based on the list of questions and a logical relationship between the questions is obtained; and a project team develops the data management plan for the project by means of team collaboration, divides and combines the semantic knowledge models of the data management plans developed all team members to obtain a comprehensive semantic knowledge model of the data management plan, compares the comprehensive semantic knowledge model of the data management plan with the semantic knowledge models of the data management plans developed all team members to mark differences between the models, and maps them to the data management plan presented in the form of the mind map according to the mind map mapping specifications based on the semantic knowledge model.

It can be seen from the above technical solutions that the present disclosure provides a method for generating a scientific data management in the field of population health based on a mind map, and compared with the prior art, the present disclosure has the following beneficial effects: 1) the present disclosure can help researchers perform data management more efficiently. Based on a mind map, researchers can present various elements of a data management plan in a form of graph, which facilitates sorting and organization and makes the data management plan clearer and easier to implement; 2) the present disclosure can recommend the corresponding data management plan templates according to different research fields and data management requirements, the data management plan can be formulated and managed dynamically in the form of a mind map, that is, modifying, adding and deleting the nodes, etc., the content and organization method of the data management plan can be adjusted at any time, which cannot only adapt to the dynamic changes in scientific research work, but also help researchers manage the data more flexibly and improve the quality and practicality of data; 3) with the sharing and backup functions of the present disclosure, researchers can jointly manage the data on the same platform, help team members collaborate more efficiently, reduce communication and exchange costs and improve the efficiency and results of scientific research; and 4) the present disclosure has the advantages of helping researchers sort out and organize various elements of the data management plan, manage the data management plan and the team collaboration, etc. in a dynamic manner, which can greatly improve the efficiency and results of scientific research and has broad application prospects.

BRIEF DESCRIPTION OF THE DRAWINGS

In order to more clearly illustrate the technical solution in embodiments of the present disclosure or in the prior art, a brief introduction to the accompanying drawings required for the description of the embodiments or the prior art will be provided below. Obviously, the accompanying drawings in the following specification are merely embodiments of the present disclosure. Those of ordinary skill in the art would also derive other accompanying drawings from these accompanying drawings without making inventive efforts.

FIG. 8 is a RDF document of a semantic knowledge model of a data management plan (DMP) in the field of population health disclosed in an embodiment of the present disclosure.

FIG. 9 is a RDF document of a semantic knowledge model of a hypertension data management plan disclosed in an embodiment of the present disclosure.

DETAILED DESCRIPTIONS OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. All the other embodiments obtained by those of ordinary skill in the art based on the embodiments in the present disclosure without creative efforts shall fall within the scope of protection of the present disclosure.

In the present disclosure, for example, first, second, and the like, are used herein merely for distinguishing one entity or operation from another entity or operation but do not necessarily require or imply that there exists any actual relation or sequence between these entities or operations; and terms "comprising", "including" or any other variants thereof are intended to cover the non-exclusive including, thereby making that the process, method, object or apparatus comprising a series of elements comprise not only those elements but also other elements that are not listed explicitly or the inherent elements to the process, method, merchandise or apparatus. Without further limitations, an element limited by the phrase "comprising/including a" does not exclude that there exists another same element in the process, method, merchandise or apparatus comprising the element.

Figure 1:
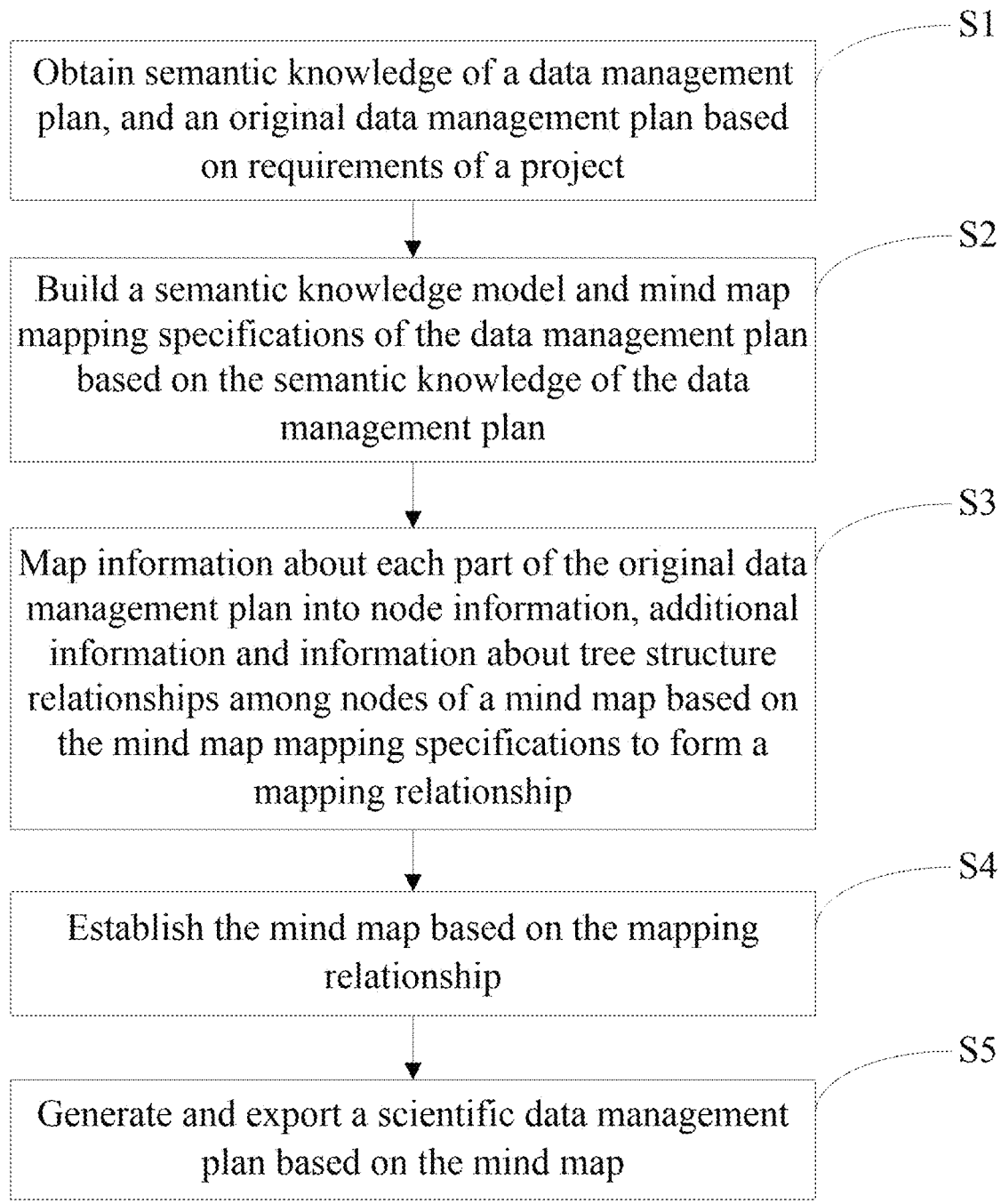
FIG. 1 is a flowchart diagram of a method for generating a scientific data management in the field of population health based on a mind map.

With reference to FIG. 1, the present disclosure provides a method for generating a scientific data management in the field of population health based on a mind map, including the following steps:

S1. obtain semantic knowledge of a data management plan, and an original data management plan based on requirements of a project;

S2. build a semantic knowledge model and mind map mapping specifications of the data management plan based on the semantic knowledge of the data management plan;

S3. map information about each part of the original data management plan into node information, additional information and information about tree structure relationships among nodes of a mind map based on the mind map mapping specifications to form a mapping relationship;

S4. establish the mind map based on the mapping relationship; and

S5. generate and export a scientific data management plan based on the mind map.

Specifically, the "semantic knowledge of a data management plan" in S1 is generally divided into three parts: plan overview, contributors and plan details, where the part of plan overview mainly briefs name, summary, starting time and ending time of the project, and the like; the part of contributors mainly specify names, employers, contact information and other basic information of the chief expert, data administrator, project contact person and other roles of the project; and the part of plan details specifies in detail a detail plan about data involved in the entire lifecycle from the beginning to the end of the project, and the plan details are subjected to a plurality of classification methods, for example, the plan details of the data management plan can be classified as data acquisition, data storage and data sharing based on the project lifecycle data management process.

Further, "a semantic knowledge model of the data management plan" in S2 is used to support a user in developing the data management plan by himself and collaborating with team members to develop the data management plan in a collaborative manner; and the mind map mapping specifications are divided into mind map mapping specifications based on a list of questions and mind map mapping specifications based on the semantic knowledge model.

Specifically, the constructed semantic knowledge model of the data management plan is used to support the user in developing the data management plan by himself and collaborating with the team members to develop the data management plan in a collaborative manner. In the process of developing the data management plan, the user is encouraged to split, modify and supplement the semantic knowledge model of the data management plan.

After the semantic knowledge model of the data management plan is constructed according to business requirements, a resource description framework (RDF) file of the semantic knowledge model of the data management plan needs to be obtained. RDF is a set of technical specifications for markup languages proposed by the World Wide Web Consortium (W3C) and is written based on the Extensible Markup Language (XML). A RDF document contains nodes of the semantic knowledge model and attribute information about the nodes, as well as logical relationships among the nodes. The RDF file based on the semantic knowledge model of the data management plan is more convenient for mapping the data management plan into the mind map.

Further, the mind map mapping specifications based on the list of questions include mapping specifications of a title and mapping specifications of the list of questions, where the mapping specifications of the title includes a name and a module of the data management plan, the module includes a module name and additional information about the module, and additional information about the module includes description or explanatory information about module contents; and the mind map mapping specifications based on the semantic knowledge model include mapping specifications of nodes and attributes, mapping specifications of relationships among the nodes, modification and improvement specifications of the mind map formed after mapping, and mapping specifications for team members to collaborate in developing the data management plan.

Specifically, the mapping specifications of nodes and attributes include classes and instances in a semantic schema, as well as mapping specifications various attributes of the classes and instances. The classes and the instances include concept names in both Chinese and English, the attributes include content of the attributes, format requirements, language requirements, and the like, such as string type and dataTime. The mapping specifications of relationships among the nodes include relationships among the classes, relationships among the class and the instances and relationships among the instances. The modification and improvement specifications of the mind map formed after mapping are mapping specifications that need to be developed due to differences in structure between the semantic knowledge model and the mind map, the semantic knowledge model is a network structure relationship, and the mind map is a true structure relationship. The mapping specifications for team members to collaborate in developing the data management plan refers to the labeling specifications for the same content and different content in the data management plan after the division, combination and mapping of the semantic knowledge graph are completed.

Further, in S3, the node information includes a node name, a plan name corresponding to the original data management plan, a module name, questions and answers, and concept names of classes and instances in the semantic knowledge model of the data management plan;

the additional information includes attributes of nodes, supplementary and explanatory information corresponding to the module name and problems of the original data management plan, and attribute information about classes and instances in the semantic knowledge model of the data management plan;

the tree structure relationships among the nodes include starting node information, ending node information and relationship attributes between two nodes; and information about a tree structure relationship between two nodes is determined according to the mapping relationship.

Further, the "information about a tree structure relationship between two nodes is determined according to the mapping relationship" includes:

1) the mind map mapping specifications based on the list of questions is determined as the information about the tree structure relationship between two nodes, the plan name is determined as a central theme name of the mind map, and an N-level module name is mapped to an N-level node name of the mind map; when a question contains an answer, the answer is mapped to a leaf node; and when no answer is available to the question, the question is mapped to the leaf node; and 2) the mind map mapping specifications based on the semantic knowledge model is determined as the information about the tree structure relationship between two nodes, a superclass in the semantic knowledge model is determined as a starting node according to the mapping relationship, and a subclass or an instance corresponding to the superclass is determined as an ending node; or a node corresponding to a domain attribute of the semantic relationship is determined as a starting node, and a node corresponding to a range attribute of the semantic relationship is determined as an ending node; and relationship attributes between two nodes are determined according to a semantic relationship between a parent node and a child node or a parent node and an instance, as well as between two classes or two instances.

Further, in S4, "establish the mind map" includes: compare the nodes and the graph relationships among nodes of the mind map obtained by mapping with the tree structure relationship of the mind map, find redundant nodes and graph relationships from the mind map obtained by mapping, and add a list of nodes to be deleted and a list of graph relationships to be deleted; and find missed graph relationships from the mind map obtained by mapping, and add a list of graph relationships to be supplemented.

Further, in S5, "generate a data management plan" includes: steps of generating a human-readable data management plan presented in the form of a list of questions, or a data management plan presented in the form of a mind map, or steps of generating files of a machine-readable data management plan, where the redundant nodes and graph relationships in the mind map are subject to deletion constraints according to the mind map mapping specifications, the list of nodes to be deleted, the list of graph relationships to be deleted and the list of graph relationships to be supplemented, and missed relationships in the mind map are supplemented, such that a mind map that can clearly and accurately express the content of the data management plan based on the list of questions and a logical relationship between the questions is obtained; and a project team develops the data management plan for the project by means of team collaboration, divides and combines the semantic knowledge models of the data management plans developed all team members to obtain a comprehensive semantic knowledge model of the data management plan, compares the comprehensive semantic knowledge model of the data management plan with the semantic knowledge models of the data management plans developed all team members to mark differences between the models, and maps them to the scientific data management plan presented in the form of the mind map according to the mind map mapping specifications based on the semantic knowledge model.

Figure 2:
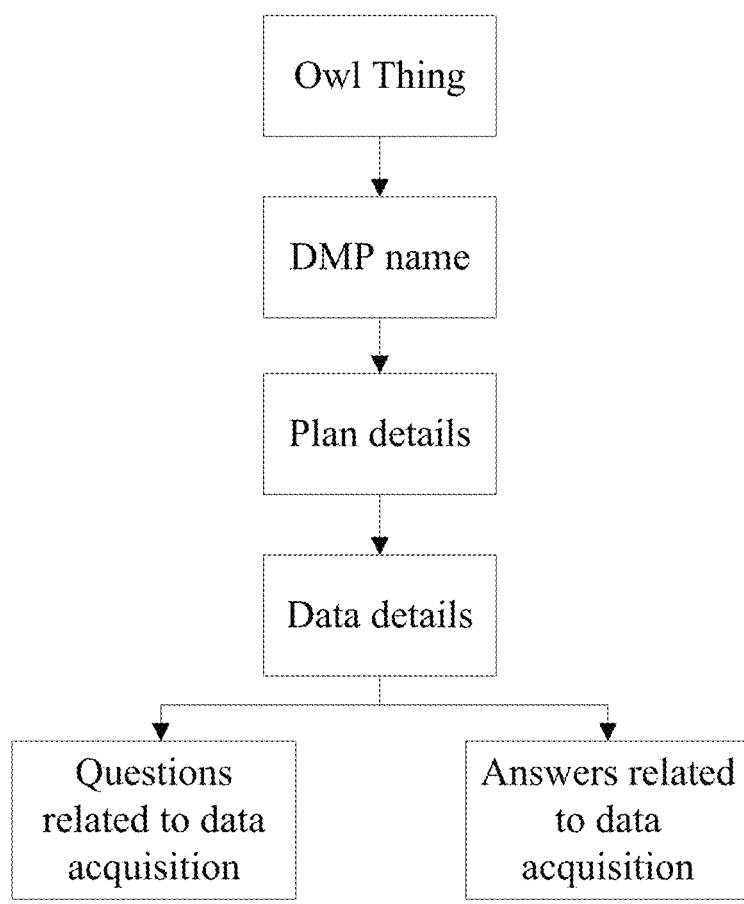
FIG. 2 is a diagram of a semantic knowledge model of a data management plan (DMP) in the field of population health disclosed in an embodiment of the present disclosure.

In a specific embodiment, this embodiment takes the development of a data management plan (DMP) in the field of population health as an example for illustration. The development of a data management plan in the field of population health includes:

S1. construct a semantic knowledge model and mind map mapping specifications of the data management plan based on business demands;

S1.1 construct the semantic knowledge model of the data management plan based on business demands and obtaining a RDF file based on the semantic knowledge model of the data management plan; and as shown in FIG. 2, this embodiment constructs a data management plan (DMP) semantic knowledge model in the field of population health using the Stanford ontology construction tool Protégé, and stores the semantic knowledge model as a RDF file, as shown in FIG. 8.

Specifically, the RDF file of the DMP semantic knowledge model is a tree structure marked with owl. A <rdf: RDF> at the very beginning indicates that this is a header declaration of a RDF document, which defines a namespace of the document, as well as the RDF and OWL versions used, and the like. a "</rdf:RDF>" indicates the end of the RDF document.

Each line starting with a "<owl:" indicates that a certain piece of information in the semantic knowledge model will be defined next; a "/>" indicates the end of this tag; and "</owl:" indicates the end of this definition.

For example, when the RDF file of the DMP semantic knowledge model is read according to the embodiment given above, a "<owl:Ontology" will be read sequentially, and this line is an ontology definition and does not display the content of the mind map.

When reading is performed to get an "<owl: ObjectProperty", indicating that the semantic knowledge model has an object property "has_answer", and a "<rdfs:domain" indicates that the object property points from a class of "Question Related to data acquisition" to a class of "Answer Related to data acquisition" ("<rdfs:range"). When reading is performed to get a "</owl: ObjectProperty>", indicating that the definition of the object property ends.

When continuous reading is performed to get an "<owl: class", it can be seen that the semantic knowledge model has a class of "DMP name" and a class of "data acquisition", where the class of "data acquisition" is a subclass of "plan details" ("<rdfs:subClassOf"); a "<rdfs:comment>" indicates that this class has a comment attribute, and content thereof is "this section will describe the data you plan to collect or develop", and when reading is performed to get an "</owl:Class>", indicating that the definition of the class ends.

When continuous reading is performed to get an "<owl: Class", it can be seen that the semantic knowledge model has a class of "Answer Related to data acquisition", which is a subclass of "data acquisition"; and when reading is performed to get an "</owl:Class>", indicating that the definition of the class ends.

When continuous reading is performed to get an "<owl: Class", it can be seen that the semantic knowledge model has a class of "Question Related to data acquisition", which is a subclass of "data acquisition"; and reading is performed to get an "</owl:Class>", indicating that the definition of the class ends.

When continuous reading is performed to get an "<owl: Class", it can be seen that the semantic knowledge model has a class of "plan details", which is a subclass of "DMP Name"; and reading is performed to get an "</owl:Class>", indicating that the definition of the class ends.

A"</rdf:RDF>" indicates the end of the RDF document.

S1.2 construct the mind map mapping specifications, including:
  1) mind map mapping specifications based on a list of questions;
  the mapping specifications include mapping specifications of a title and mapping specifications of the list of questions. The mapping specifications of the title include a name and a module of the data management plan. The module refers to the situation that different data management plan templates that divide the data management plan into different parts according to their respective logical structures, and a data management plan can have modules at various levels. The module includes a module name and additional information about the module. In the data management plan, the additional information about the module is mainly the description or explanatory information about the module contents.

The mapping specifications of the list of questions include questions and logical relationships among the questions. The questions refer to data-related questions that need to r, be solved through research, such as how to effectively manage, store, share, protect and describe data. The questions include the data-related questions that need to be solved through research, additional information about the questions and answers thereto. Additional information about the questions records the annotation information or supplementary information of the question, or the information about sample answers. When the user fails to provide an answer to a question, the question will be presented in the mind map alone in the form of a leaf node; when a user provides an answer thereto, the question and the answer will be stored in a temporary storage library in the form of a pair of key values of the answer to the question, and the answer will be presented one-to-one as a leaf node in the mind map. The logical relationships among the questions mainly record the order in which the user fills in the answers, for example, when the user fills in the answer to the third question, the user needs to jump to the seventh question to continue to complete the development of the data management plan.

The mind map mapping specifications based on the list of questions are specifically as follows:
  I. set a plan name of the project to be mapped as a central theme name of the mind map;
  II. set an N-level module name of the data management plan to be mapped as an N-level node name of the mind map;
  III. perform a setting when the user fails to provide an answer to a question, the specific question of the data management plan is mapped to be a leaf node under a corresponding module node of the mind map; when the user provides an answer to a question, the question and the answer will be stored in a temporary storage library in the form of a pair of key values of the answer to the question, and the answer thereof is mapped to be a leaf node of the corresponding question;
  IV. set the additional information about the module and the questions to be mapped as additional information about the corresponding node of the mind map; and
  V. map the logical relationships among the questions to hyperlinks among nodes of the mind map.
  2) mind map mapping specifications based on the semantic knowledge model;
  in practical application, the mind map mapping specifications based on the semantic knowledge model can be customized by the user to facilitate personalized customization and expansion of mapping relationships.

In an embodiment of the present disclosure, the mind map mapping specifications based on the semantic knowledge model is defined as follows based on the embodiment requirements:
  a) firstly, map nodes and attributes, with the mapping specifications as follows:
  An <owl:Class indicates that the content contained after # in this line is a class, which is mapped to the corresponding node in the mind map.

In the <owl:Class module, the content contained after # in this line of "<rdfs:subClassOf" is mapped to an upper-level node of the class.

An <owl:NamedIndividual indicates that content contained after # in this line is a specific instance constructed by the user, and is mapped to the next node of the corresponding class.

An <owl:DatatypeProperty indicates that content contained after # in this line is the data property. In this embodiment, additional information about the questions in the corresponding data management plan is the annotation information or supplementary information of the question, or the information about sample answers.

An <rdfs:comment> in the "<owl:Class" module indicates that the class has a property "comment", and the content between two <rdfs:comment> is the description or explanatory information about the class, and is mapped as additional information about the corresponding node of the mind map.

b) perform the mapping specifications of relationships among the nodes, with the mapping specifications as follows:
I. An <owl:ObjectProperty indicates that the content contained after # in this line is a project property, that is, a semantic relationship between two classes, namely, a predicate of a RDF triplet.
II. In the <owl:ObjectProperty module, the content contained after # in a line of "<rdfs:domain" is a subject of the predicate, and the content contained after # in a line of "<rdfs:range" is an object of the predicate. An object attribute in this embodiment is "has_answer", which represents a connection between a question and an answer in the data management plan. The answer will be mapped to a leaf node of the mind map, and the question will be mapped to an upper-level node of the corresponding answer.
III. A "<rdfs:subClassOf" in the module of "<owl:Class" indicates that the content contained after # in the line of <owl:Class is a subclass of the class contained after # in the line of <rdfs:subClassOf, that is, the class contained after # in the line of <owl:Class is a next level node contained after # in the line of <rdfs:subClassOf.
IV. A "<rdf:type" in the module of "<owl:NamedIndividual" indicates that the content contained after # in the line of <rdf:type is a class of instance contained after # in the line of <owl:NamedIndividual, that is, "Class instance_of Instance", namely, a semantic relationship between them is stored as "instance_of" and the instance is mapped to a leaf node of the corresponding class in the mind map.
V. Semantic relationships among the instances in the same class are mapped to hyperlinks among nodes of the corresponding instances in the mind map.
c) Delete redundant node information and information about graph relationships among the nodes of the mind map after mapping, and supplement the missed graph relationships among the nodes of the mind map formed after mapping:
I. delete the nodes of the mind map formed after the mapping of a "DMP name" class, regard a node of the mind map formed after the mapping of instances of the class as a central subject node of the mind map, and delete the graph relationships of the mind map formed after the mapping of the "DMP name" class and its instance and other classes;
II. transform the graph relationships of the mind map formed by mapping the semantic relationships among the "DMP name" class and other classes to the graph relationships of the mind map between instance nodes of the "DMP name" class and nodes of other classes, and complete the supplement to the graph relationships in the mind map;
III. delete all the graph relationships of the mind map formed by mapping all the semantic relationships among the classes other than the graph relationships of the mind map formed by mapping of "subClassOf";
IV delete nodes of the mind map formed by mapping a class of "Questions Related to xx" to a class of "Answers Related to xx", and the graph relationships among other nodes; and
V. construct "instance_of" semantic relationships among instances of the class of "Questions Related to xx" and a superclass of the class of "Answers Related to xx", and complete the graph relationship mapping of the mind map of the "instance_of" semantic relationships among the instances of the class of "Questions Related to xx" and the superclass of the class of "Answers Related to xx".

d) When team members of the project team collaborate to develop the data management plan, after the splitting and combination of the semantic knowledge model is completed, different modules and contents of N semantic models (N equals to the number of data management plans developed by the team members) are intuitively distinguished by using different colors, making the name of creators, and using other methods in a newly integrated semantic model.

S2. map information about each part of the data management plan into node information, additional information and information about tree structure relationships among nodes of a mind map based on the mind map mapping specifications.

The system will first recommend relevant data management plan to the user by using semantic analysis technology based on the pre-constructed semantic knowledge model according to the information filled in by the user, such as project category, discipline classification and plan name, and the user can use the recommended data management plan or choose to develop his own data management plan according to business demands.

S2.1 When the user chooses to use the recommended data management plan.

When the user chooses to use the recommended data management plan, the system will perform the mind map mapping for the project name, module name, questions, logical relationships among the questions, additional information of the module or questions and the answer of the data management plan according to the mind map mapping specifications based on the list of questions in S1.2.

Specifically, when the user does not provides answers to the questions of the data management plan, the project name of the data management plan is mapped to the central theme of the mind map, the name of the N-level module is mapped to the N-level node of the mind map, the specific questions in the module are mapped to the leaf nodes under the corresponding module of the mind map, and the logical relationships among the questions are realized by adding hyperlinks among the corresponding question nodes of the mind map. Specifically, the hyperlinks among the corresponding question nodes of the mind map can be implemented through customized editing in the hypertext markup language (HTMIL). For the additional information about the module and the questions, various forms such as floating windows, external tags or embedded nodes can be used to show the additional information about the module and the questions on the corresponding nodes, such that the mind map can display main information about the data management plan while carrying the additional information at the same level.

S2.2 When the user chooses to establish the data management plan by himself according to the business demands.

When the user chooses to establish the data management plan by himself according to the business demands, the system will recommend a corresponding data management plan framework and corresponding questions corresponding to each module to the user according to the pre-constructed semantic knowledge model and a question library. The user can add, delete and modify the recommended module of the data management plan according to the business demands, and annotate the nodes, the additional information about the nodes and the relationships among the nodes of the semantic knowledge model in the mind map mapping specifications based on the semantic knowledge model in S1.2.

Figure 3:
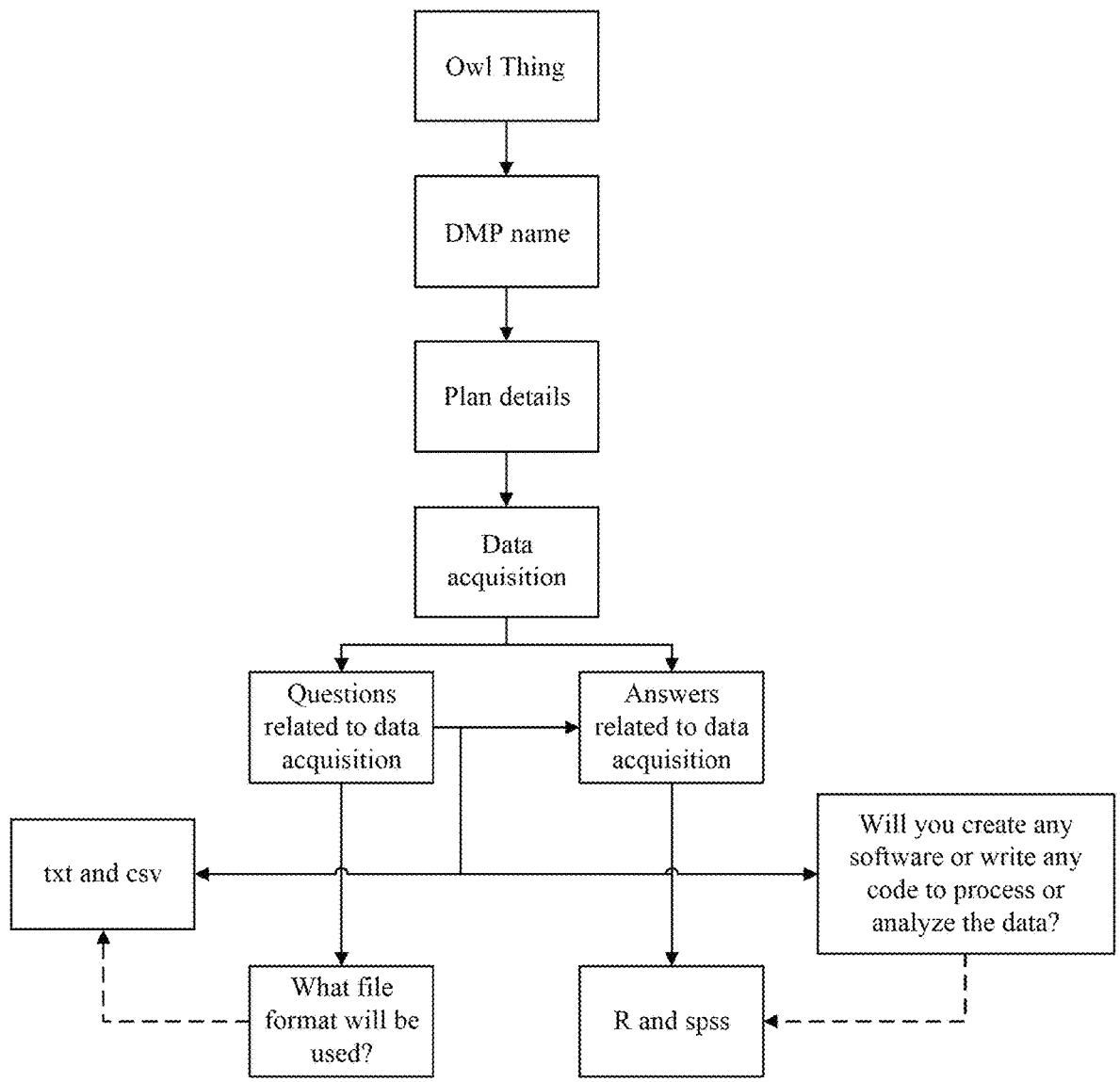
FIG. 3 is a semantic knowledge model of a hypertension data management plan constructed by a user disclosed in an embodiment of the present disclosure.

A process that a data management plan developed by the user himself is mapped to a mind map will be described below by taking a data acquisition module of a hypertension data management plan constructed by the user as an example, as shown in FIG. 3.

1) acquire a RDF document of the semantic knowledge model, as shown in FIG. 9; and
2) read node information and attribute information about classes and instances, as well as relationship information among classes and instances in the RDF document in sequence, and parse them.

Specifically, a node database and a database for relationships among the nodes are constructed. The node database is used to temporarily store information about various types and instances in the semantic knowledge model that has been read; and the database for relationships among the nodes is used to temporarily store the information about semantic relationships among various types and instances in the semantic knowledge model.

The "reading the RDF document in sequence" includes:

I. When reading is performed to get an "<owl:ObjectProperty", it can be seen that the model contains a predicate relationship "has_answer", and points from a class of "Question Related to data acquisition" to a class of "Answer Related to data acquisition".

II. When reading is performed to get an "<owl:DatatypeProperty",it can be seen that instances of the model have a data attribute "comment", and that the character type of content thereof is string.

III. When continuous reading is performed to get "<owl:Class", it can be seen that the model has a class "DMP name";

the model has a class "data acquisition", which is a subclass of "plan details" and has an attribute of "Comment", and content of the attribute is "this section will describe the data you plan to collect or develop";

the model has a class of "answers related to data acquisition", which is a subclass of the "data acquisition";

the model has a class of "questions related to data acquisition", which is a subclass of the "data acquisition";

the model has a class of "plan details", which is a subclass of the "DMP name";

IV. continuous reading is performed to get an "<owl:NamedIndividual", it can be seen that the model has an instance "R and spss", which is an instance of the class of "answers related to data acquisition";

the model has an instance "txt and csv", which is an instance of the class of "answers related to data acquisition";

the model has an instance "what file format will be used?", which is an instance of the "questions related to data acquisition", and a semantic relationship with the instance "txt and csv" is "has_answer". It has a data attribute "Comment", with specific content of "for all collected or generated data, please specify the file format to be used for storage, for example, plain text (.txt), comma separated value (.csv), geo-reference TIFF (.tif .tfw);"

the model has an instance "Will you create any software or write any code to process or analyze the data", which is an instance of the "questions related to data acquisition", and a semantic relationship with the instance "R and spss" is "has_answer". It has a data attribute of "Comment", with specific content of "If yes, please specify in details"; and the model has an instance "hypertension data management plan", which is an instance of the "DMP name".

V. Continuous reading is performed to get a "</rdf:RDF>", indicating that the document ends.

The information about nodes and relationships among the nodes read thereby are stored in the node database and the database for relationships among the nodes and are used for model parsing and mind map mapping. The information about nodes and relationships among the nodes in this embodiment are shown in Tables 1 and 2 below:

TABLE 1

Node Database

| Class | Instance | Attribute content of the class | Attribute content of the instance |
|---|---|---|---|
| DMP name | R and spss | | |
| Data acquisition | txt and csv | Comment: This section will describe the data you plan to collect or create | |
| Answers related to data acquisition | What file format will be used? | | Comment: for all collected or generated data, please specify the file format to be used for storage, for example, plain text (.txt), comma separated value (.csv), geo-reference TIFF (.tif. tfw)" |
| Questions related to data acquisition | Will you create any software or write any code to process or analyze the data? | | If yes, please specify in details |
| Plan details | Hypertension data management plan | | |
| Questions related to data acquisition | | | |

TABLE 2

Database for Relationships among the Nodes

| Class/Instance 1 | Class/Instance 2 | Relationship type |
| --- | --- | --- |
| Questions related to data acquisition | Answers related to data acquisition | has_answer |
| Answers related to data acquisition | Data acquisition | subClassOf |
| Questions related to data acquisition | Data acquisition | subClassOf |
| Plan details | DMP name | subClassOf |
| Answers related to data acquisition | R and spss | instance_of |
| Answers related to data acquisition | txt and csv | instance_of |
| Questions related to data acquisition | What file format will be used? | instance_of |
| What file format will be used? | txt and csv | has_answer |
| Questions related to data acquisition | Will you create any software or write any code to process or analyze the data? | instance_of |
| Will you create any software or write any code to process or analyze the data? | R and spss | has_answer |
| DMP name | Hypertension data management plan | instance_of |

3) map the classes, instances and attribute information, as well as the relationships among them read according to the mapping sections as graph information of the mind map.

In an embodiment of the present disclosure, the mapping of the node information and the attribute information of the semantic knowledge model to the graph information of the mind map is performed. Specifically, the "DMP name, data acquisition, answers related to data acquisition, plan details, questions related to data acquisition" and the instances "R and spss, txt and csv, what file format will be used, will you create any software or write any code to process or analyze the data, and hypertension data management plan", as well as the "Comment: this section will describe the data you plan to collect or develop" of the attributes of the classes are mapped to the additional information about nodes of "data acquisition" of the mind map; and the "Comment: for all collected or generated data, please specify the file format to be used for storage, for example, plain text (.txt), comma separated value (.csv), geo-reference TIFF (.tif .tfw)" and "If yes, please specify in details" of the attributes of the instances are mapped to the additional information about the nodes of the "what file format will be used?" and "Will you create any software or write any code to process or analyze the data" respectively.

In an embodiment of the present disclosure, after the mapping of nodes is completed, the mapping of the information about semantic relationships of the semantic knowledge model and the information about tree structure relationships of the mind map is performed according to the mind map mapping specifications based on the semantic knowledge model. Specifically, all semantic relationships in the semantic knowledge model can be obtained, and the semantic relationships include semantic relationships among classes and semantic relationships among instances. The graph relationships among all nodes of the mind map are sorted out, including subclasses and superclass relationships among classes (subClassOf) and other semantic relationships among classes (such as has_answer), semantic relationships among classes and instances (instance_of), and semantic relationships among instances formed after the semantic relationships among instance inherit classes (such as has_answer), which are mapped to the tree structure relationships among all nodes in the mind map according to the subject and object information about each semantic relationship.

Specifically, it can be seen from the semantic relationships among classes and instances read through the mind map mapping specifications based on the semantic knowledge model that:

I. the "has_answer" semantic relationships between the class of "questions related to data acquisition" and the class of "answers related to data acquisition" are mapped to the graph relationships that the node of "questions related to data acquisition" pointing to the node of "answers related to data acquisition" in the mind map;

II. the "subClassOf" semantic relationships between the class of "answers related to data acquisition" and the class of "data acquisition", the "subClassOf" semantic relationships between the class of "questions related to data acquisition" and the class of "data acquisition" and the "subClassOf" semantic relationships between the class of "plan details" and the class of "DMP name" are mapped to the graph relationships that the node of "answers related to data acquisition" pointing to the node of "data acquisition", that the node of "questions related to data acquisition" pointing to the node of "data acquisition", and that the node of "plan details" pointing to the node of "DMP name" in the mind map;

III. the "instance_of" semantic relationships between the class of "answers related to data acquisition" and the instance of "R and spss", the "instance_of" semantic relationships between the "answers related to data acquisition" and the instance of "txt and csv"; and the "instance_of" semantic relationships between the class of "answers related to data acquisition" and the instance of "what file format will be used?" are mapped to the graph relationships that the node of "answers related to data acquisition" pointing to the node of "R and spss", that the node of "answers related to data acquisition" pointing to the node of "txt and cvs", and that the node of "questions related to data acquisition" pointing to the node of "what file format will be used?" in the mind map;

IV. the "has_answer" semantic relationship between the instance of "what file format will be used?" and the instance of "txt and cvs" is mapped to the graph relationship that the node of "what file format will be used?" pointing to the node of "txt and csv" in the mind map;

V. the "instance_of" semantic relationship between the class of "questions related to data acquisition" and the instance of "will you create any software or write any code to process or analyze the data?" is mapped to the graph relationship that the node of "questions related to data acquisition" pointing to the node of "will you create any software or write any code to process or analyze the data?" in the mind map;

VI. the "has_answer" semantic relationship between the class of "will you create any software or write any code to process or analyze the data?" and the instance of "R and spss" is mapped to the graph relationship that the node of "will you create any software or write any code to process or analyze the data?" pointing to the node of "R and spss" in the mind map; and VII. the "instance_of" semantic relationship between the class of "DMP name" and the instance of "hypertension data management plan" is mapped to the graph relationship that the node of "DMP name" pointing to the node of "hypertension data management plan" in the mind map.

In this embodiment, the data management plan by the user can be converted into a data management plan containing marks through the annotation method and the mapping method provided in the present disclosure. The mind map mapping specifications of the present disclosure does not limit the position of the mark, nor does it limit the above marking method, and other method of mind map mapping based on the data management plan are also within the scope of the present disclosure.

S3. Establish the mind map according to the obtained node information, additional information and information about tree structure relationships among the nodes.

Figure 4:
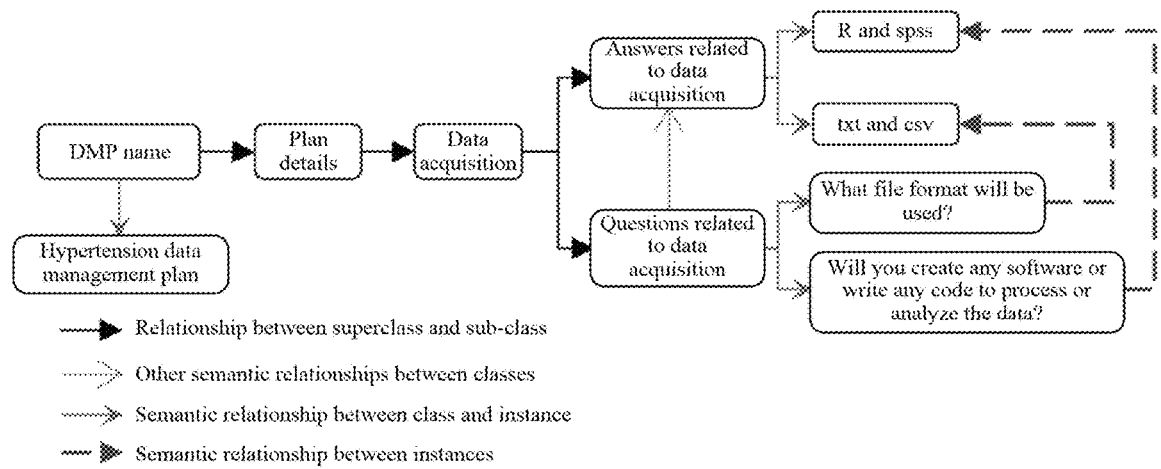
FIG. 4 is a schematic diagram of a process that a semantic knowledge model of a hypertension data management plan is converted into a mind map disclosed in an embodiment of the present disclosure.

A mind map is obtained according to the graph relationship among nodes of the mind map obtained through parsing is shown in FIG. 4.

Figure 5:
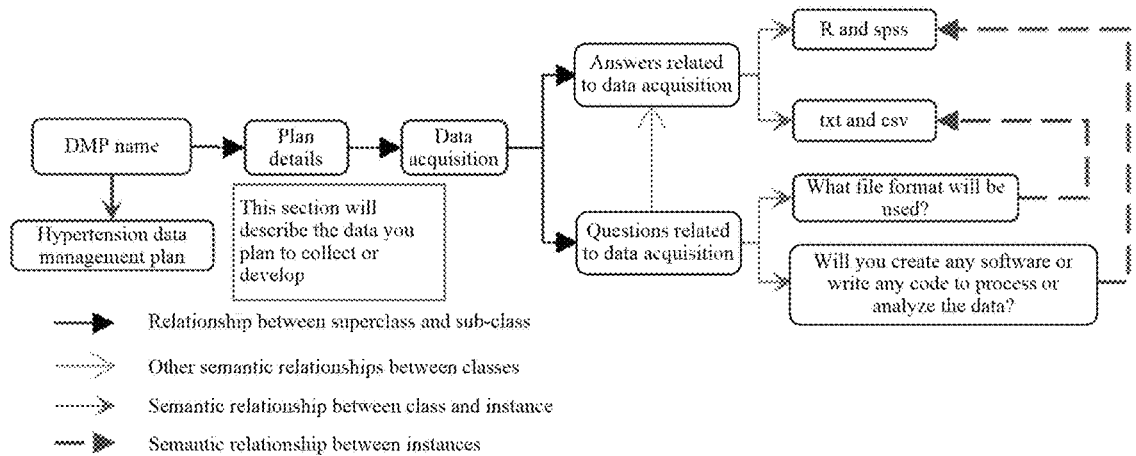
FIG. 5 is a schematic diagram of nodes of display plan details disclosed in an embodiment of the present disclosure.

In this embodiment, the attribute information about the classes and instances is implemented through the floating windows, for example, in the mind map, when a mouse node (a point that a cursor or arrow of the mouse) hovers over the plan details node, additional information about the plan details node will be displayed, as shown in FIG. 5.

Deleting redundant node information and information about graph relationships among the nodes of the mind map after mapping, and supplementing the missed graph relationships among the nodes of the mind map for the hypertension data management plan formed after mapping.

In this embodiment, the mind map mapping specifications based on the semantic knowledge model:

I. delete the node of the mind map "DMP name" formed after the mapping of a "DMP name", regard the node of the mind map "hypertension data management plan" formed after the mapping of instances of the class "hypertension data management plan" as a central subject node of the mind map, and delete the graph relationships of the mind map formed after the mapping of the "DMP name" class and its instance "hypertension data management plan" and other class of "plan details";

II. transform the graph relationships of the mind map formed by mapping the semantic relationships between the "DMP name" class and the "plan details" class to the graph relationships of the mind map between instance nodes of the "hypertension data management plan" class and nodes of "plan details", and complete the supplement to the graph relationships in the mind map;

III. delete all the graph relationships of the mind map formed by mapping all the semantic relationships among the classes other than the graph relationships of the mind map formed by mapping of "subClassOf";

IV. delete nodes of the mind map formed by mapping the class of "questions related to data acquisition" to the class of "answers related to data acquisition", and the graph relationships among other nodes; and V. construct the "instance_of" semantic relationships between the instances of "what file format will be used?" and "will you create any software or write any code to process or analyze the data?" of the class of "questions related to data acquisition" and the superclass of "data acquisition" of the class of "questions related to data acquisition", and complete the mapping of the "instance_of" semantic relationship between the instances of "what file format will be used?" and "will you create any software or write any code to process or analyze the data?" and the class of "data acquisition".

S4. Generate and export the data management plan

Figure 6:
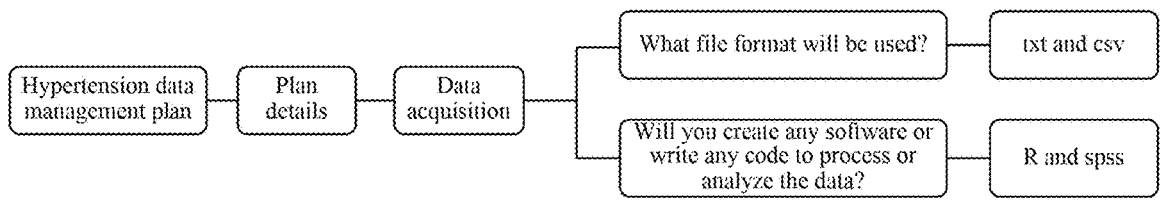
FIG. 6 is a schematic diagram of a mind map of a hypertension data management plan disclosed in an embodiment of the present disclosure.

The semantic knowledge model in this embodiment is mapped to the mind map according to the mind map mapping specifications based on the semantic knowledge model, as shown in FIG. 6;

when the user selects to develop the data management plan for the project by means of team collaboration, the system will compare the data management plans constructed by different team members. Specifically, the system will strictly compare the semantic relationships among the classes, entitles and attributes in the semantic knowledge models of data management plans constructed by each team member one by one to generate a new semantic knowledge model of a data management plan, which includes the same and different parts of the original model. The nodes, the additional information about the nodes and the relationships among the nodes of the semantic knowledge model in the mind map mapping specifications are then annotated based on the semantic knowledge model in S1.2, different colors are used to annotate the names of the creators of different modules and content in the semantic model, so as to continuously improve the data management plan of the project and improve the quality of the data management plan.

Figure 7:
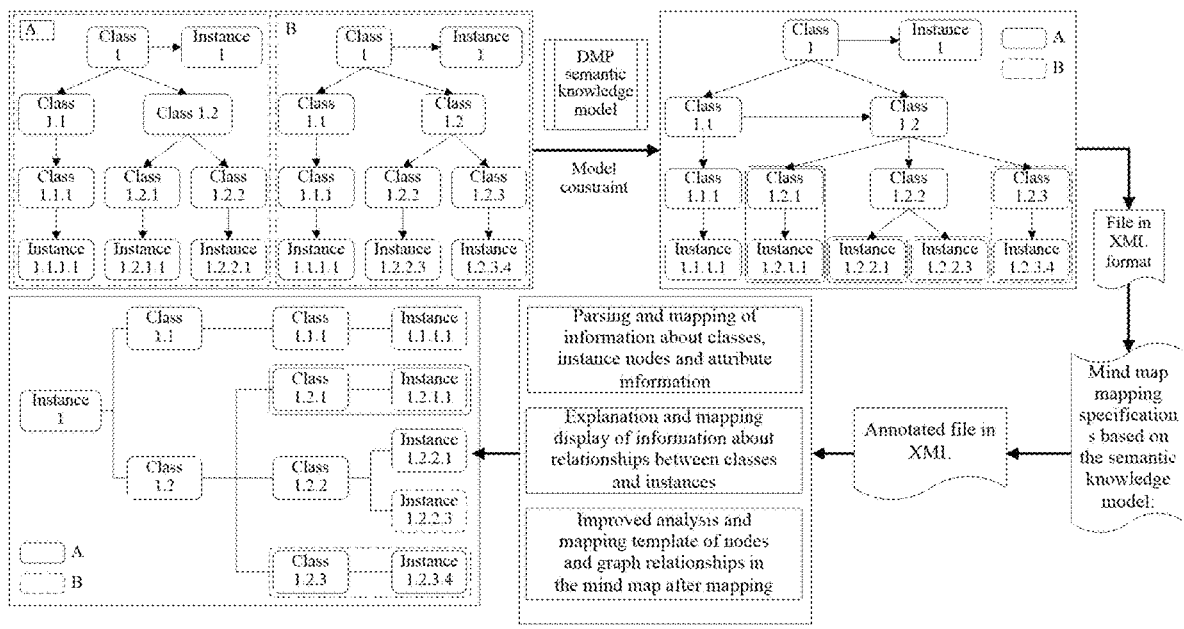
FIG. 7 is a schematic diagram of a mapping process that team members collaborate to develop a data management plan disclosed in an embodiment of the present disclosure.

The specific mapping process is shown in FIG. 7.

The present disclosure supports the user to export the completed data management plan in various forms, such as Word and PDF, and images in the mind map can be exported in the form of mind map or JSON machine-readable formats, facilitating the sharing with others or storage.

Various embodiments in the specification are described in a progressive manner, each embodiment focuses on differences from other embodiments, and the same and similar parts between the embodiments may refer to each other. In particular, since systems or system embodiments are substantially similar to the method embodiments, the description thereof is relatively simple, and relevant details can be referred to the description of the method embodiments. The systems or system embodiments described above are merely schematic, where units described as separate components may or may not be physically separated, and a component displayed as a unit may or may not be a physical unit, that is, the component may be located at one place, or distributed on a plurality of network units. Part or all of the modules may be selected according to actual requirements to achieve the objective of the solution of the embodiments. Those of ordinary skill in the art may understand and implement the present disclosure without making the inventive effort.

Those skilled in the art may further realize that units and algorithm steps of various examples described with reference to the embodiments disclosed herein may be implemented in electronic hardware, computer software or a combination of electronic hardware and computer software.

The above description of the disclosed embodiments enables professionals skilled in the art to achieve or use the present disclosure. Various modifications to the embodiments are readily apparent to professionals skilled in the art, and the general principles defined herein may be implemented in other embodiments without departing from the spirit or scope of the present disclosure. Therefore, the present disclosure is not limited to the embodiments shown herein but falls within the widest scope consistent with the principles and novel features disclosed herein.

What it claimed is:

1. A method for generating scientific data management in a field of population health based on a mind map, comprising the following steps:
    S1: obtaining semantic knowledge of a data management plan, and an original data management plan based on requirements of a project;
    S2: building a semantic knowledge model and mind map mapping specifications of the data management plan based on the semantic knowledge of the data management plan;
    S3: mapping information about each part of the original data management plan into node information, additional information and information about tree structure relationships among nodes of the mind map based on the mind map mapping specifications to form a mapping relationship;
    S4: establishing the mind map based on the mapping relationship; and
    S5: generating and exporting a scientific data management plan based on the mind map; wherein
    the mind map mapping specifications are divided into mind map mapping specifications based on a list of questions and mind map mapping specifications based on the semantic knowledge model;
    the mind map mapping specifications based on the list of questions comprise mapping specifications of a title and mapping specifications of the list of questions, wherein the mapping specifications of the title comprises a name and a module of a project data management plan, the module comprises a module name and additional information about the module, and the additional information about the module comprises description or explanatory information about module contents;
    the mind map mapping specifications based on the semantic knowledge model comprise mapping specifications of nodes and attributes, mapping specifications of relationships among the nodes, modification and improvement specifications of the mind map formed after mapping, and mapping specifications for team members to collaborate in developing the data management plan;
    in S3, the node information comprises a node name, a plan name corresponding to the original data management plan, a module name, questions and answers, and concept names of classes and instances in the semantic knowledge model of the data management plan;
    the additional information comprises attributes of nodes, supplementary and explanatory information corresponding to the module name and problems of the original data management plan, and attribute information about classes and instances in the semantic knowledge model of the data management plan;
    the tree structure relationships among the nodes comprise starting node information, ending node information and relationship attributes between two nodes;
    information about a tree structure relationship between two nodes is determined according to the mapping relationship; wherein
    the "information about a tree structure relationship between two nodes is determined according to the mapping relationship" comprises:
    1) the mind map mapping specifications based on the list of questions is determined as the information about the tree structure relationship between two nodes, the plan name is determined as a central theme name of the mind map, and an N-level module name is mapped to an N-level node name of the mind map; when a question contains an answer, the answer is mapped to a leaf node; and when no answer is available to the question, the question is mapped to the leaf node; and
    2) the mind map mapping specifications based on the semantic knowledge model is determined as the information about the tree structure relationship between two nodes, a superclass in the semantic knowledge model is determined as a starting node according to the mapping relationship, and a subclass or an instance corresponding to the superclass is determined as an ending node; or a node corresponding to a domain attribute of a semantic relationship is determined as the starting node, and a node corresponding to a range attribute of a semantic relationship is determined as the ending node; and relationship attributes between two nodes are determined according to semantic relationships between a parent node and a child node, or between the parent node and the instance, as well as between two classes or two instances.

2. The method for generating the scientific data management in the field of population health based on the mind map according to claim 1, wherein
    in S2, "a semantic knowledge model of the data management plan" is used to support a user in developing the data management plan by himself and collaborating with team members to develop the data management plan in a collaborative manner.

3. The method for generating the scientific data management in the field of population health based on the mind map according to claim 1, wherein
    in S4, "establishing the mind map" comprises: comparing the nodes, and graph relationships among nodes of the mind map obtained by mapping with a tree structure relationship of the mind map, finding redundant nodes and graph relationships from the mind map obtained by mapping, and adding a list of nodes to be deleted and a list of graph relationships to be deleted; and finding missed graph relationships from the mind map obtained by mapping, and adding a list of graph relationships to be supplemented.

4. The method for generating the scientific data management in the field of population health based on the mind map according to claim 1, wherein
    in S5, "generating a data management plan" comprises: steps of generating a human-readable data management plan presented in the form of a list of questions, or a data management plan presented in the form of a mind map, or steps of generating files of a machine-readable data management plan, wherein the redundant nodes and graph relationships in the mind map are subject to deletion constraints according to the mind map mapping specifications, the list of nodes to be deleted, the list of graph relationships to be deleted and the list of graph relationships to be supplemented, and missed relationships in the mind map are supplemented, such that a mind map that can clearly and accurately express a content of the data management plan based on the list of questions and a logical relationship between the questions is obtained; and a project team develops the data management plan for the project by means of team collaboration, divides and combines the semantic knowledge model of the data management plan developed by each team member to obtain a comprehensive semantic knowledge model of the data management plan, compares the comprehensive semantic knowledge model of the data management plan with the semantic knowledge model of the data management plan developed by each team member to mark differences between the models, and maps them to the scientific data management plan presented in the form of the mind map according to the mind map mapping specifications based on the semantic knowledge model.

* * * * *